US012631889B2

(12) United States Patent
Yang et al.

(10) Patent No.: US 12,631,889 B2
(45) Date of Patent: May 19, 2026

(54) ZOOM OPTICAL SYSTEM

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Yi Chen Yang, Guangdong (CN); Ting Hui Chen, Guangdong (CN); Po Lun Chen, Guangdong (CN); Yun Pei Chen, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 314 days.

(21) Appl. No.: 18/466,818

(22) Filed: Sep. 13, 2023

(65) Prior Publication Data

US 2025/0035947 A1     Jan. 30, 2025

(30) Foreign Application Priority Data

Jul. 27, 2023     (CN) .......................... 202310938887.8

(51) Int. Cl.
*G02B 27/28*          (2006.01)
(52) U.S. Cl.
CPC .................................. *G02B 27/286* (2013.01)
(58) Field of Classification Search
CPC ............. G02B 27/286; G02F 1/133526; G02F 1/133536; G02F 1/133557; G02F 1/13363; G02F 1/133638

USPC ..................................................... 359/485.01
See application file for complete search history.

(56) References Cited

U.S. PATENT DOCUMENTS

| 11,105,963 | B1 | 8/2021 | Chen et al. | |
| 2006/0007371 | A1* | 1/2006 | Miyatake ................. | G02B 5/30 |
| | | | | 349/96 |
| 2020/0379226 | A1 | 12/2020 | Steiner et al. | |

FOREIGN PATENT DOCUMENTS

| CN | 106501881 | A | 3/2017 |
| CN | 108919531 | A | 11/2018 |
| CN | 110088672 | A | 8/2019 |
| CN | 111221143 | A | 6/2020 |

(Continued)

OTHER PUBLICATIONS

CN110088672, Bao et al. Optical System, Examiner provided machine translation. (Year: 2019).*

(Continued)

*Primary Examiner* — Wyatt A Stoffa
*Assistant Examiner* — Rahman Abdur
(74) *Attorney, Agent, or Firm* — CKC & Partners Co., LLC

(57) ABSTRACT

A zoom optical system includes a first lens, a transreflective coating layer, a liquid crystal layer, a substrate, a polarizing reflector film layer and a second lens. The first lens has a first surface and an opposite second surface. The transreflective coating layer adheres to the first surface of the first lens. The liquid crystal layer adheres to the second surface of the first lens. The substrate adheres to a surface facing away the first lens of the liquid crystal layer. The polarizing reflector film layer is located at a side of the substrate facing away the liquid crystal layer. The second lens adheres to the polarizing reflector film layer by an optical adhesive layer.

15 Claims, 6 Drawing Sheets

100a

(56)     References Cited

FOREIGN PATENT DOCUMENTS

CN        116449564  A      7/2023
TW        202045982  A     12/2020

OTHER PUBLICATIONS

CN111221143, Bao and Zhao, Based on Folded Light Path and a Liquid Crystal Box of Variable Optical Path Three-dimensional Virtual Reality Display Device and Display Method, Examiner provided machine translation. (Year: 2020).*

Chen et al. (CN 116449564), Optical Device, filed on Jan. 17, 2023 (Year: 2023); [Examiner provided machine translation in English].*

Ambre et al. (CN 106501881); Method for manufacturing optical film and optical stack; (Year: 2015) [Examiner provided machine translation in English].*

* cited by examiner

ZOOM OPTICAL SYSTEM

RELATED APPLICATIONS

This application claims priority to China Application Serial Number 202310938887.8, filed Jul. 27, 2023, which is herein incorporated by reference.

BACKGROUND

Field of Disclosure

The present disclosure relates to a zoom optical system.

Description of Related Art

There are a variety of head mounted displays nowadays; one of them is the virtual reality (VR) display. When wearing a VR display, since there is only a single display monitor in the VR display, the focus position of the eye and the imaging position of the brain are different, which will generate the so-called vergence-accommodation conflict (VAC), and cause the user to feel dizzy. Therefore, it often needs additional optical element to help relief such dizziness.

However, the manufacturing method of this kind of optical element nowadays is mainly consist of a combination of a twisted nematic liquid crystal layer and a passive lens. But the manufacturing of the passive lens needs to coat the liquid crystal on the curved surface of a solid lens, which has a relatively poor smoothness. Also, the liquid crystal is vulnerable to the process temperature and the curing condition, which will cause a phase change.

SUMMARY

One aspect of the present disclosure provides a zoom optical system.

According to one embodiment of the present disclosure, a zoom optical system includes a first lens, a transreflective coating layer, a liquid crystal layer, a substrate, a polarizing reflector film layer and a second lens. The first lens has a first surface and an opposite second surface. The transreflective coating layer adheres to the first surface of the first lens. The liquid crystal layer adheres to the second surface of the first lens. The substrate adheres to a surface facing away the first lens of the liquid crystal layer. The polarizing reflector film layer is located at a side of the substrate facing away the liquid crystal layer. The second lens adheres to the polarizing reflector film layer by an optical adhesive layer.

In some embodiments of the present disclosure, the first lens includes a quarter-wave lens.

In some embodiments of the present disclosure, the first lens includes a concave lens, the second lens includes a convex lens.

In some embodiments of the present disclosure, the first lens includes a convex lens, the second lens includes a concave lens.

In some embodiments of the present disclosure, the liquid crystal layer is located between the substrate and the first lens.

In some embodiments of the present disclosure, the substrate is located between the liquid crystal layer and the polarizing reflector film layer.

In some embodiments of the present disclosure, the polarizing reflector film layer is located between the substrate and the second lens.

One aspect of the present disclosure provides a zoom optical system.

According to one embodiment of the present disclosure, a zoom optical system includes a first lens, a quarter-wave plate, a liquid crystal layer, a substrate, a polarizing reflector film layer and a second lens. The quarter-wave plate adheres to a first surface of the first lens. The liquid crystal layer adheres to the quarter-wave plate. The substrate adheres to a second surface facing away the first lens of the liquid crystal layer. The polarizing reflector film layer is located at a side of the substrate facing away the liquid crystal layer. The second lens adheres to the polarizing reflector film layer by an optical adhesive layer.

In some embodiments of the present disclosure, the first lens includes a beam splitter lens.

In some embodiments of the present disclosure, the first lens includes a concave lens, the second lens includes a convex lens.

In some embodiments of the present disclosure, the first lens includes a convex lens, the second lens includes a concave lens.

In some embodiments of the present disclosure, the liquid crystal layer is located between the quarter-wave plate and the substrate.

In some embodiments of the present disclosure, the substrate is located between the liquid crystal layer and the polarizing reflector film layer.

In some embodiments of the present disclosure, the quarter-wave plate is located between the liquid crystal layer and the first lens.

In some embodiments of the present disclosure, the polarizing reflector film layer is located between the substrate and the second lens.

In the aforementioned embodiments of the present disclosure, since the second lens is used to replace the passive lens that includes the liquid crystal, the effect of the yield is not significant in the manufacturing process. Also, the thickness of the whole zoom optical system can be adjusted by adjusting the thickness of the first lens and the second lens, which can be 1.5 times thinner than the conventional art.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
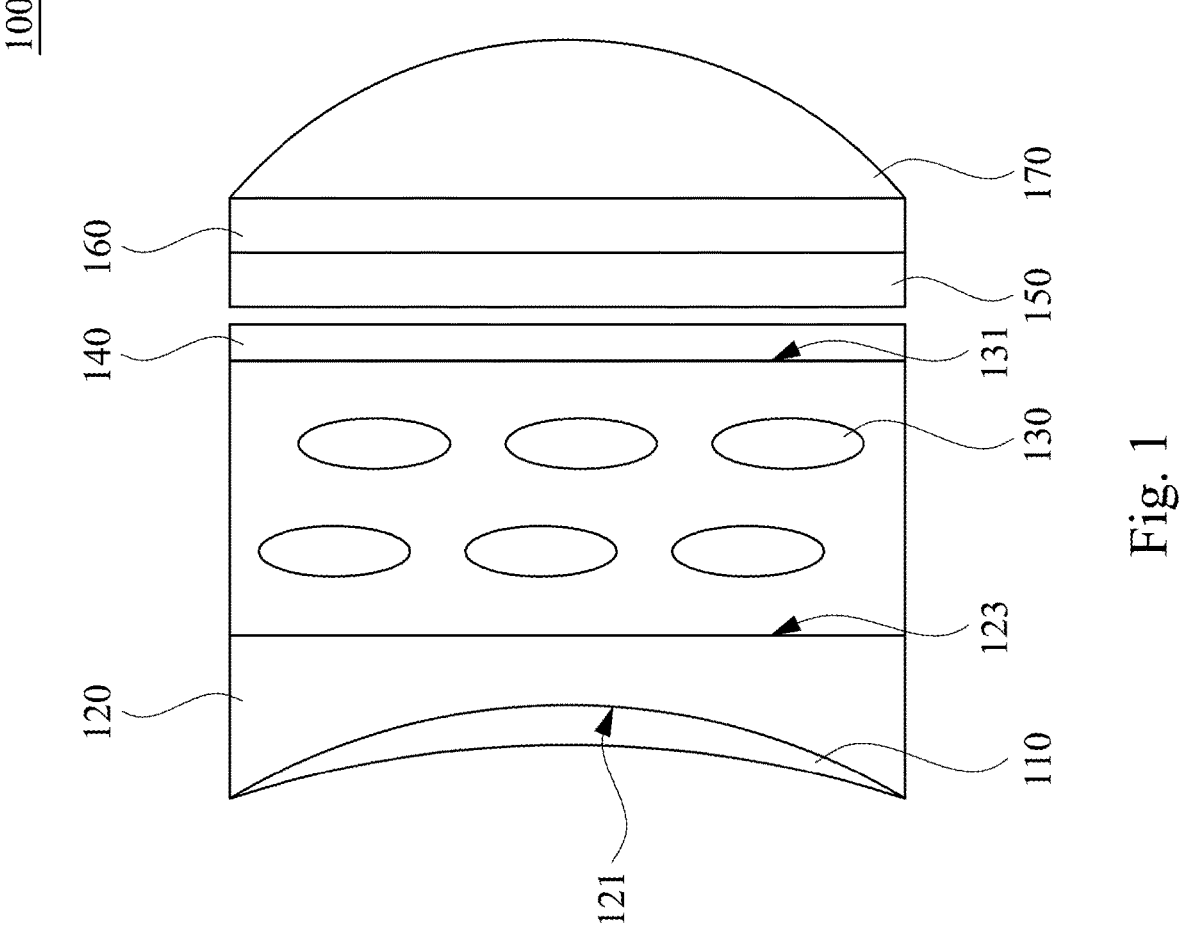
FIG. 1 is a side view of a zoom optical system according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the drawings. The spatially relative terms are intended to encompass different orientations of the device in use or operation in addition to the orientation depicted in the drawings. The apparatus may be otherwise oriented (rotated 90 degrees or at other orientations) and the spatially relative descriptors used herein may likewise be interpreted accordingly.

FIG. 1 is a side view of a zoom optical system 100 according to one embodiment of the present disclosure. Refer to FIG. 1, a zoom optical system 100 includes a first lens 120, a transreflective coating layer 110, a liquid crystal layer 130, a substrate 140, a polarizing reflector film layer 150 and a second lens 170. The transreflective coating layer 110 adheres to the first surface 121 of the first lens 120. The liquid crystal layer 130 adheres to the second surface 123 facing away the first surface 121 of the first lens 120. The substrate 140 adheres to a surface 131 facing away the first lens 120 of the liquid crystal layer 130. The polarizing reflector film layer 150 is located at a side of the substrate 140 facing away the liquid crystal layer 130. The second lens 170 adheres to the polarizing reflector film layer 150 by an optical adhesive layer 160. In other words, the liquid crystal layer 130 is located between the substrate 140 and the first lens 120. The substrate 140 is located between the liquid crystal layer 130 and the polarizing reflector film layer 150. The polarizing reflector film layer 150 is located between the substrate 140 and the second lens 170. In this embodiment, the first lens 120 includes a quarter-wave lens. The first lens 120 is configured to change a circularly polarized light into a linearly polarized light, or change a linearly polarized light into a circularly polarized light. The transreflective coating layer 110 is configured to enable half of the light to transmit and half of the light to reflect, and can change a left circularly polarized light into a right circularly polarized light, or change a right circularly polarized light into a left circularly polarized light. The polarizing reflector film layer 150 is configured to enable a specific direction (such as the direction parallel to the drawing) of a linear polarized light to transmit. In this embodiment, the first lens 120 includes a concave lens, and is configured to diverge the light. The second lens 170 includes a convex lens, and is configured to focus the light. In some embodiments, the first surface 121 is a curved surface, and the second surface 123 is a plane. In some embodiments, the zoom optical system 100 can be integrated into a VR pancake head mounted display.

Figure 2:
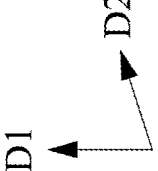
FIG. 2 is a schematic view of a light beam transmitting through the zoom optical system of FIG. 1 in a state.
Figure 3:
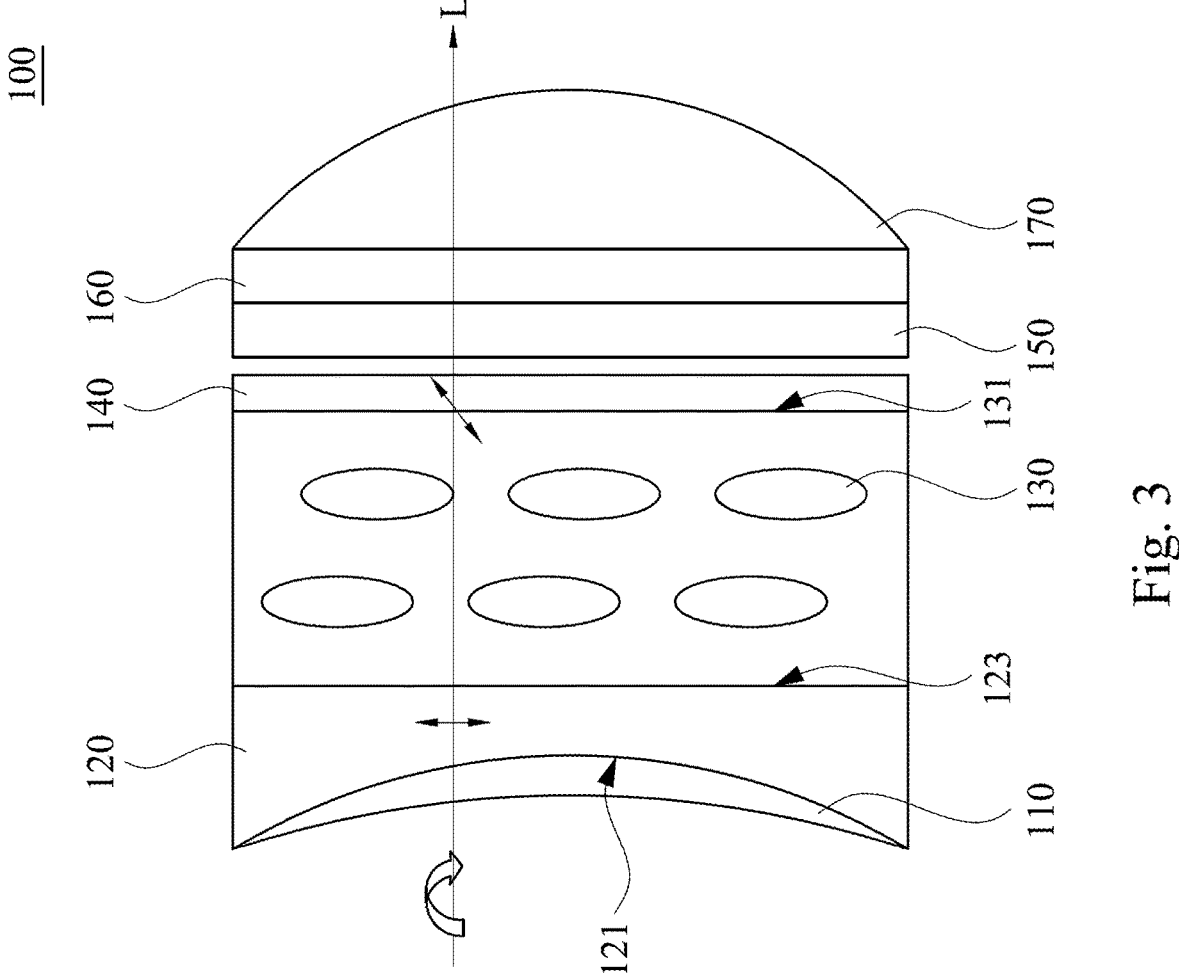
FIG. 3 is a schematic view of a light beam transmitting through the zoom optical system of FIG. 1 in another state.
Figure 3:
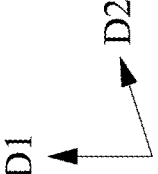

FIG. 2 is a schematic view of a light beam L transmitting through the zoom optical system 100 of FIG. 1 in a state. Refer to FIG. 2, in particular, when the display monitor of the head mounted display emits a light beam L, the light beam L is a circularly polarized light. When the light beam L transmits through the first lens 120, the transreflective coating layer 110 will enable the light beam L to transmit. Thereafter, the first lens 120 that includes a quarter-wave lens will change the circularly polarized light into a linearly polarized light in a first direction D1, and diverge the light since the first lens 120 includes a concave lens. Thereafter, the light beam L transmits through the liquid crystal layer 130 and reaches the polarizing reflector film layer 150. In this state, the liquid crystal layer 130 doesn't change the direction of the polarization of the linear polarized light. Since the polarizing reflector film layer 150 is configured to enable a specific direction (such as the direction parallel to the drawing) of a linear polarized light to transmit, the linearly polarized light in the first direction D1 will be reflected back to the liquid crystal layer 130. Then, the light beam L transmits through the first lens again. The light beam L is changed into a circularly polarized light and then reaches the transreflective coating layer 110. At this time, the transreflective coating layer 110 will change the direction of polarization of the circularly polarized light (such as changing a left circularly polarized light into a right circularly polarized light) and reflect the light beam L back such that when the light beam L transmits through the first lens 120 for the third time, the light beam L will be changed into a linearly polarized light in a second direction D2. The second direction D2 is perpendicular to the first direction D1. In FIG. 2 and FIG. 3, the second direction D2 is shown as tilted to clearly express the second direction D2, but in real applications, the second direction D2 is perpendicular to a paper surface. The linearly polarized light in a second direction D2 can transmit through the polarizing reflector film layer 150 and reaches the second lens 170. Through this kind of folded optical path, the zoom optical system 100 can zoom using the first lens 120 and the second lens 170. The diopter of the zoom optical system 100 is the sum of three times of the diopter of the first lens 120 and the diopter of the second lens 170.

FIG. 3 is a schematic view of a light beam L transmitting through the zoom optical system 100 of FIG. 1 in another state. Refer to FIG. 3, the difference of the state of FIG. 3 and the state of FIG. 2 is that, in the state of FIG. 3, the liquid crystal layer 130 will change the direction of polarization of the light beam L such that the direction of polarization is changed from the first direction D1 to the second direction D2. Thus, when the light beam L transmits through the liquid crystal layer 130 and changes the direction of polarization, it will directly transmit through the polarizing reflector film layer 150 and reaches the second lens 170. In this state, the diopter is the sum of the diopter of the first lens 120 and the diopter of the second lens 170. Therefore, the zoom optical system 100 can have better zoom effect through switching between the two states, and thus relieving the vergence-accommodation conflict.

Since the second lens is used to replace the passive lens that includes the liquid crystal, the effect of the yield is not significant in the manufacturing process. Also, the thickness of the whole zoom optical system can be adjusted by adjusting the thickness of the first lens and the second lens, which can be 1.5 times thinner than the conventional art.

Figure 4:
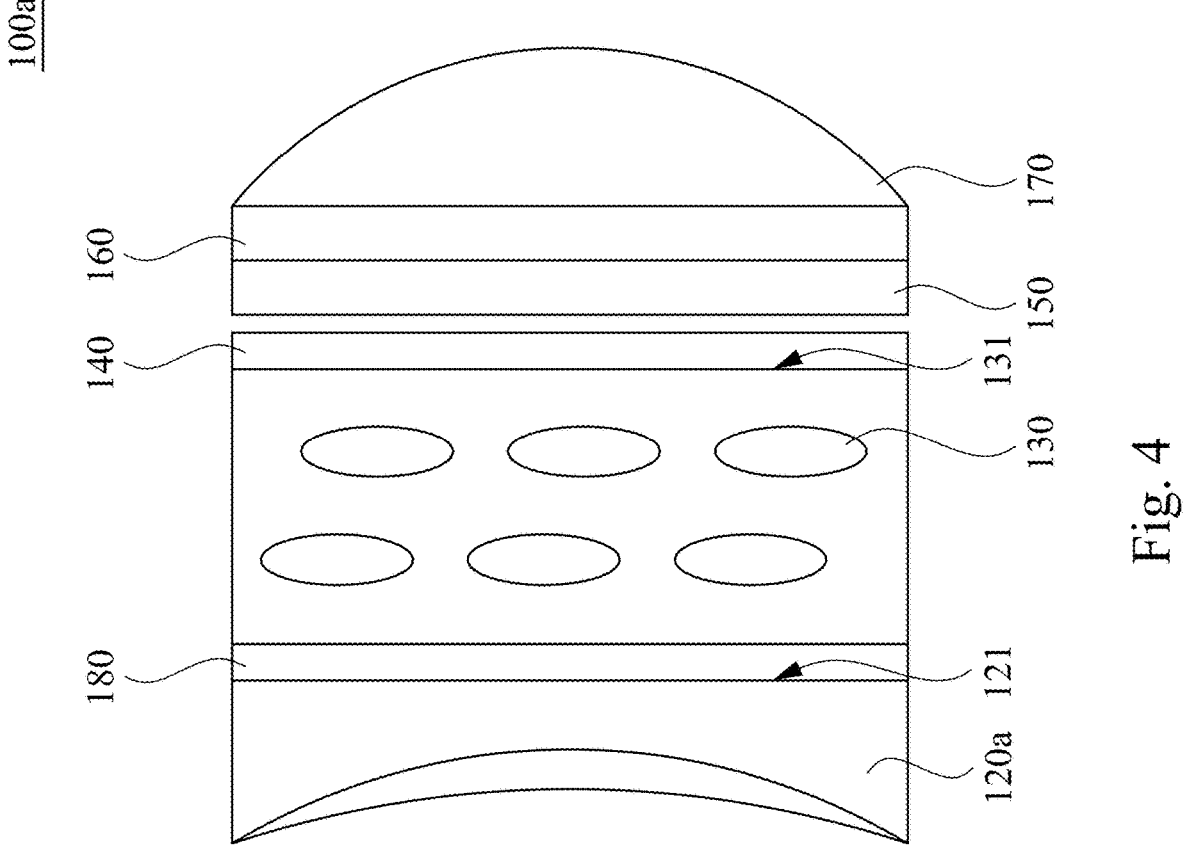
FIG. 4 is a side view of a zoom optical system according to another embodiment of the present disclosure.

FIG. 4 is a side view of a zoom optical system 100a according to another embodiment of the present disclosure. Refer to FIG. 4, a zoom optical system 100a includes a first lens 120a, a quarter-wave plate 180, a liquid crystal layer 130, a substrate 140, a polarizing reflector film layer 150 and a second lens 170. The quarter-wave plate 180 adheres to a first surface 121 of the first lens 120a. The liquid crystal layer 130 adheres to the quarter-wave plate 180. In other words, the quarter-wave plate 180 is located between the liquid crystal layer 130 and the first lens 120a. The liquid crystal layer 130 is located between the quarter-wave plate 180 and the substrate 140. The substrate 140 is located between the liquid crystal layer 130 and the polarizing reflector film layer 150. The substrate 140 adheres to a second surface 131 facing away the first lens 120*a* of the liquid crystal layer 130. The polarizing reflector film layer 150 is located at a side of the substrate 140 facing away the liquid crystal layer 130. The second lens 170 adheres to the polarizing reflector film layer 150 by an optical adhesive layer 160. The first lens 120*a* includes a concave lens, the second lens 170 includes a convex lens. In this embodiment, the first lens 120*a* includes a beam splitter lens. The bema splitter lens has the same effect as the transreflective coating layer 110 of FIG. 1. In other words, the light can still optionally transmits through the liquid crystal layer 130 three times or one time, and thus achieve the same zooming effect.

In particular, in the embodiment of FIG. 4, the circularly polarized light will transmit through the first lens 120*a* and changes into a linearly polarized light of a first direction at the quarter-wave plate 180. The light then transmits through the liquid crystal layer 130, and then reaches polarizing reflector film layer 150. The polarizing reflector film layer 150 will reflect the linearly polarized light of the first direction back to the liquid crystal layer 130 and the quarter-wave plate 180. The quarter-wave plate 180 then changes the linearly polarized light of the first direction into the circularly polarized light. The light then transmits into the first lens 120*a*. Here, since the first lens 120*a* includes a beam splitter lens, and thus the first lens 120*a* has the same effect as the transreflective coating layer 110 of FIG. 1, which is changing the direction of polarization of the circularly polarization light (if the light emitted at the beginning is a left circularly polarization light, it will be changed into a right circularly polarization light) and reflect the light. The light then transmits through the quarter-wave plate 180 and changes into a linearly polarized light of a second direction. In some embodiments, the second direction is perpendicular to the first direction. The light then transmits through the liquid crystal layer 130, then transmits through the polarizing reflector film layer 150 and reaches the second lens 170. Thus, the light can still optionally passes through the liquid crystal layer 130 three times or one times same as the embodiment of FIG. 1, which achieves a better zooming effect and relief the vergence-accommodation conflict.

Figure 5:
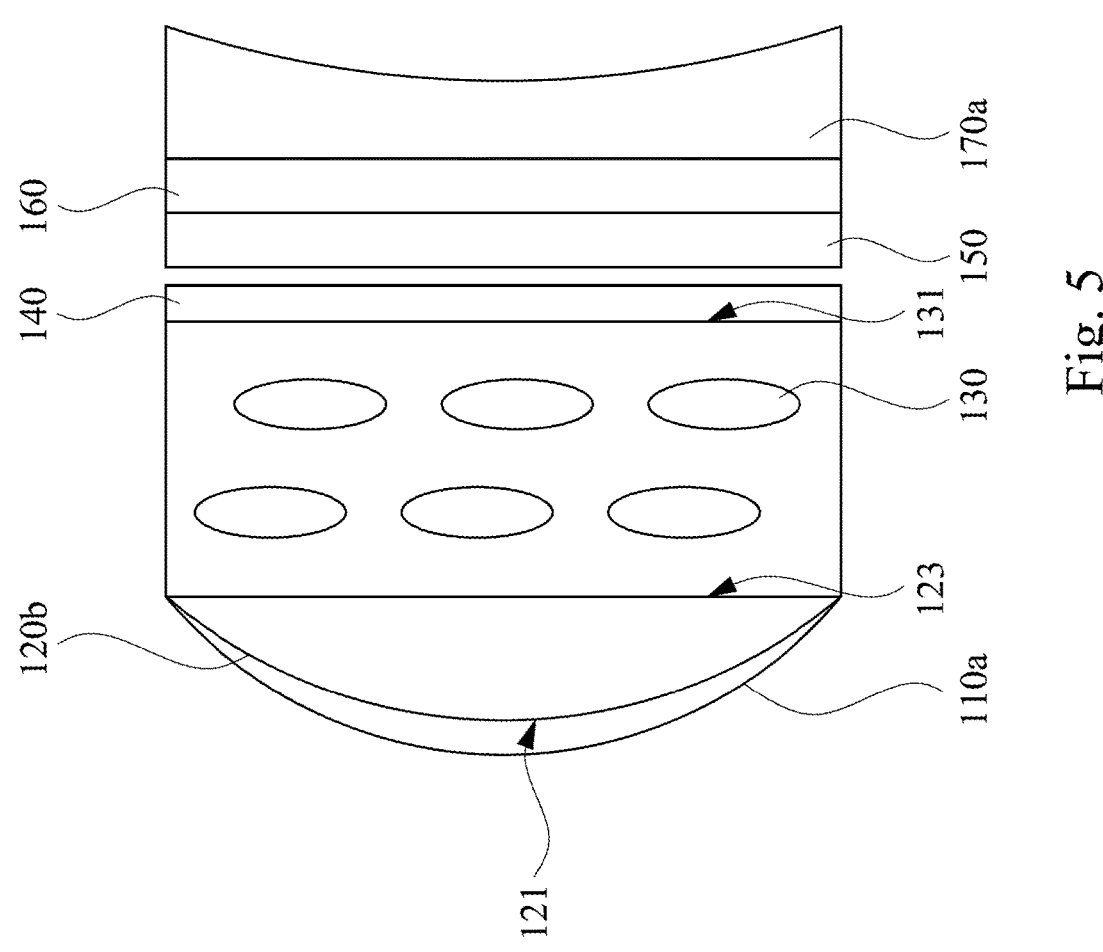
FIG. 5 is a side view of a zoom optical system according to yet another embodiment of the present disclosure.

FIG. 5 is a side view of a zoom optical system 100*b* according to yet another embodiment of the present disclosure. Refer to FIG. 5, a zoom optical system 100*b* includes a first lens 120*b*, a transreflective coating layer 110*a*, a liquid crystal layer 130, a substrate 140, a polarizing reflector film layer 150 and a second lens 170*a*. The difference between this embodiment and the embodiment of FIG. 1 is that, in this embodiment, the first lens 120*b* includes a convex lens, the second lens 170*a* includes a concave lens. In this embodiment, the first lens 120*b* includes a quarter-wave lens. The first lens 120*b* is configured to change a circularly polarized light into a linearly polarized light, or to change a linearly polarized light into a circularly polarized light.

Figure 6:
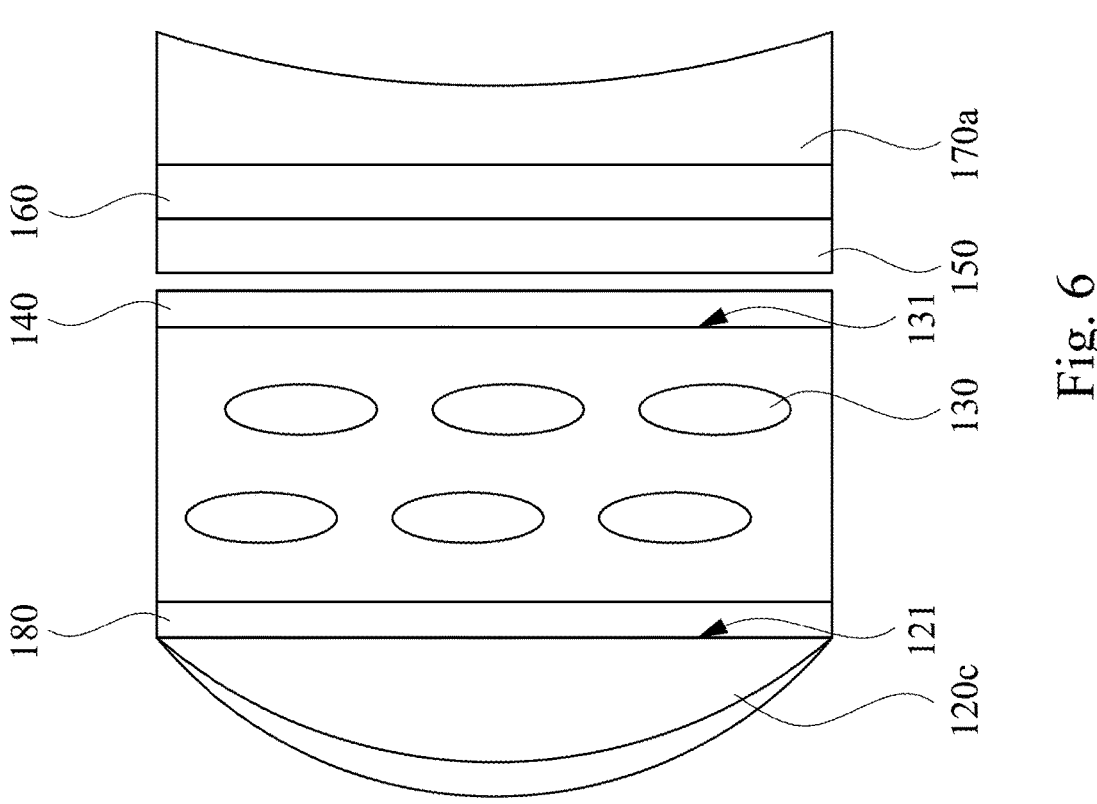
FIG. 6 is a side view of a zoom optical system according to yet another embodiment of the present disclosure.

FIG. 6 is a side view of a zoom optical system 100*c* according to yet another embodiment of the present disclosure. Refer to FIG. 6, a zoom optical system 100*c* includes a first lens 120*c*, a quarter-wave plate 180, a liquid crystal layer 130, a substrate 140, a polarizing reflector film layer 150 and a second lens 170*a*. The difference between this embodiment and the embodiment of FIG. 5 is that, in this embodiment, the first lens 120*c* includes a convex lens, the second lens 170*a* includes a concave lens. In this embodiment, the first lens 120*c* includes a beam splitter lens. The beam splitter lens has the same effect as the transreflective coating layer 110 of FIG. 1. In other words, the light can still optionally transmits through the liquid crystal layer 130 three times or one time, and thus achieve the same zooming effect.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A zoom optical system, comprising:
 a first lens having a first surface and an opposite second surface;
 a transreflective coating layer adhered to the first surface of the first lens;
 a liquid crystal layer adhered to the second surface of the first lens;
 a substrate adhered to a surface facing away the first lens of the liquid crystal layer, wherein the first lens directly contacts the transreflective coating layer and the liquid crystal layer, and the liquid crystal layer directly contacts the first lens and the substrate;
 a polarizing reflector film layer located at a side of the substrate facing away the liquid crystal layer; and
 a second lens adhered to the polarizing reflector film layer by an optical adhesive layer.

2. The zoom optical system of claim 1, wherein the first lens comprises a quarter-wave lens.

3. The zoom optical system of claim 1, wherein the first lens comprises a concave lens, the second lens comprises a convex lens.

4. The zoom optical system of claim 1, wherein the first lens comprises a convex lens, the second lens comprises a concave lens.

5. The zoom optical system of claim 1, wherein the liquid crystal layer is located between the substrate and the first lens.

6. The zoom optical system of claim 1, wherein the substrate is located between the liquid crystal layer and the polarizing reflector film layer.

7. The zoom optical system of claim 1, wherein the polarizing reflector film layer is located between the substrate and the second lens.

8. A zoom optical system, comprising:
 a first lens;
 a quarter-wave plate adhered to a first surface of the first lens;
 a liquid crystal layer adhered to the quarter-wave plate;
 a substrate adhered to a second surface facing away the first lens of the liquid crystal layer, wherein the quarter-wave plate directly contacts the first lens and the liquid crystal layer, and the liquid crystal layer directly contacts the quarter-wave plate and the substrate;
 a polarizing reflector film layer located at a side of the substrate facing away the liquid crystal layer; and
 a second lens adhered to the polarizing reflector film layer by an optical adhesive layer.

9. The zoom optical system of claim 8, wherein the first lens comprises a beam splitter lens.

10. The zoom optical system of claim 8, wherein the first lens comprises a concave lens, the second lens comprises a convex lens.

11. The zoom optical system of claim 8, wherein the first lens comprises a convex lens, the second lens comprises a concave lens.

12. The zoom optical system of claim 8, wherein the liquid crystal layer is located between the quarter-wave plate and the substrate.

13. The zoom optical system of claim 8, wherein the substrate is located between the liquid crystal layer and the polarizing reflector film layer.

14. The zoom optical system of claim 8, wherein the quarter-wave plate is located between the liquid crystal layer and the first lens.

15. The zoom optical system of claim 8, wherein the polarizing reflector film layer is located between the substrate and the second lens.

\* \* \* \* \*